United States Patent [19]
Gerpheide

[11] Patent Number: 5,861,875
[45] Date of Patent: Jan. 19, 1999

[54] METHODS AND APPARATUS FOR DATA INPUT

[75] Inventor: George E. Gerpheide, Salt Lake City, Utah

[73] Assignee: Cirque Corporation, Salt Lake City, Utah

[21] Appl. No.: 763,351

[22] Filed: Dec. 11, 1996

Related U.S. Application Data

[63] Continuation of Ser. No. 193,275, Feb. 8, 1994, which is a continuation of Ser. No. 914,043, Jul. 13, 1992, Pat. No. 5,305,017.

[51] Int. Cl.$^6$ .............................. G06F 3/03; G08C 2/00
[52] U.S. Cl. ........................................ 345/174; 178/18.06
[58] Field of Search .................................. 345/168, 173, 345/174, 179; 341/20, 23; 178/18.06, 19.03

[56] References Cited

U.S. PATENT DOCUMENTS

| | | |
|---|---|---|
| 4,071,691 | 1/1978 | Pepper, Jr. . |
| 4,246,452 | 1/1981 | Chandler . |
| 4,455,452 | 6/1984 | Schuyler . |
| 4,495,485 | 1/1985 | Smith . |
| 4,550,221 | 10/1985 | Mabusth . |
| 4,587,378 | 5/1986 | Moore . |
| 4,672,154 | 6/1987 | Rodgers et al. . |
| 4,686,332 | 8/1987 | Greanias et al. . |
| 4,736,191 | 4/1988 | Matzke et al. . |
| 4,740,781 | 4/1988 | Brown . |
| 4,743,895 | 5/1988 | Alexander . |
| 4,873,400 | 10/1989 | Rapp . |
| 4,975,830 | 12/1990 | Gerpheide . |
| 5,305,017 | 4/1994 | Gerpheide . |

FOREIGN PATENT DOCUMENTS

| | | |
|---|---|---|
| 56-132028 | 10/1981 | Japan . |
| 61-115118 | 5/1984 | Japan . |
| 60-192033 | 9/1984 | Japan . |

*Primary Examiner*—Richard A. Hjerpe
*Assistant Examiner*—M. Fatahi-Yar
*Attorney, Agent, or Firm*—Thorpe, North & Western, LLP

[57] ABSTRACT

Methods and apparatus for data input. Devices are provided in accordance with this invention which utilize capacitive coupling of an object to the device to sense the object's position. The devices are comprised of a plurality of electrode strips which form virtual electrodes. The virtual electrodes are selectively connected to form virtual dipole electrodes which are responsive to the object's position.

14 Claims, 13 Drawing Sheets

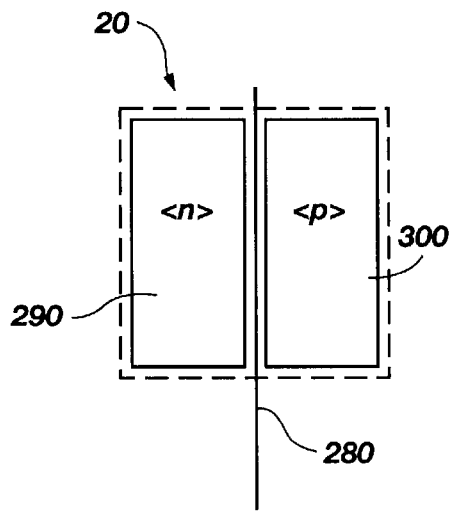
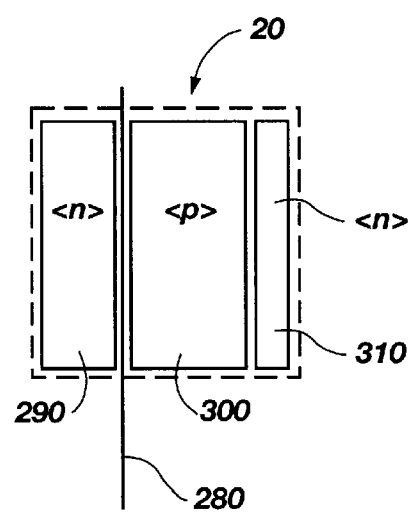
*Fig. 5(a)*   *Fig. 5(b)*
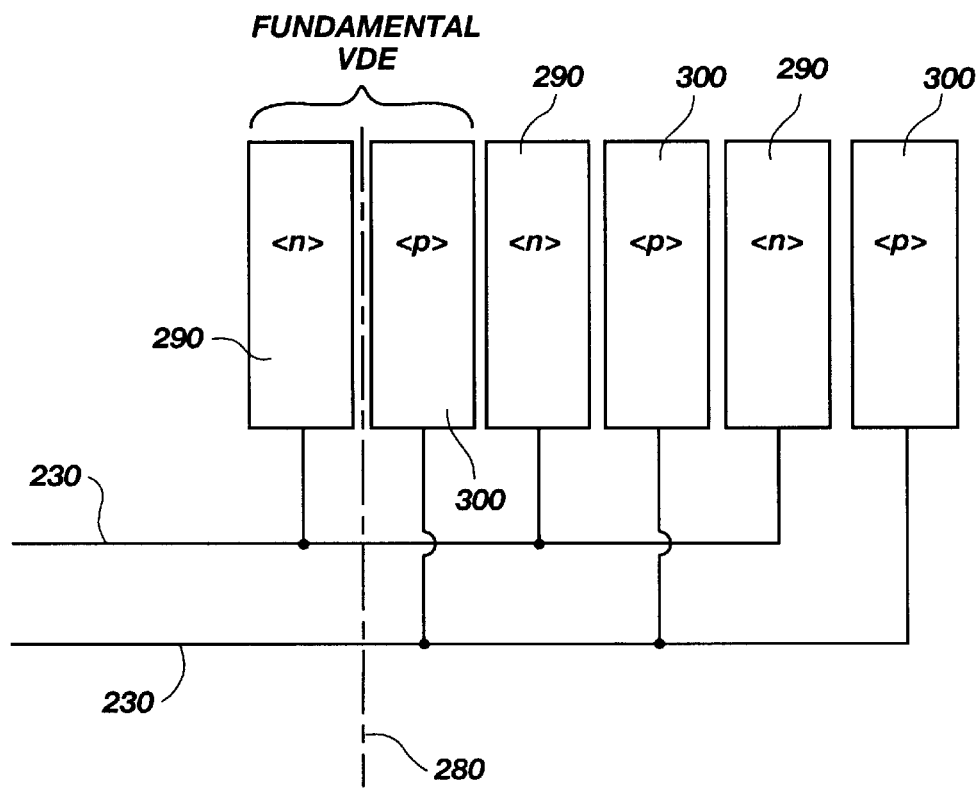
*Fig. 6*

METHODS AND APPARATUS FOR DATA INPUT

This application is a continuation of U.S. application Ser. No. 08/193,275 filed Feb. 8, 1994, which is a continuation of prior application Ser. No. 07/914,043 filed on Jul. 13, 1992, now U.S. Pat. No. 5,305,017.

FIELD OF THE INVENTION

This invention relates generally to methods and apparatus for data input. More specifically, this invention relates to touch sensitive input devices for data input to computers and other instruments.

BACKGROUND OF THE INVENTION

Input devices for computers are well known in the art. There are several types of input devices, such as the familiar "mouse", which have been utilized and are generally useful in providing "user friendly" computer systems for both technical and non-technical applications. The popularity which these devices have achieved in the art can be given large credit for fostering the explosive growth of the personal computer industry since they provide a simple means for users to input data to computers for users.

Currently, about 95% of all input devices or "pointing devices" are mice. A mouse generally requires a free-rolling surface on which it can interface. Depending upon the particular mouse which is used, the device couples to the free-rolling surface and translates movement across the surface as an input to a computer. Thus, the mouse is unsuitable for any input application which cannot provide space for a rolling surface. The current and growing popularity of "laptop" computers thus has created a significant problem for mouse type technologies which require a rolling surface. Laptops are generally used in small confined areas such as, for example, airplanes, where there is insufficient room for a rolling surface. Therefore, a long-felt need in the art exists for non-mouse pointing solutions for computers and other instruments.

A further long-felt need in the art exists for input and pointing devices which are simple to use and which can be easily integrated with current computers. This long-felt need has not been solved by previous mechanical ball or shaft rolling technologies, such as, for example, track balls. Furthermore, new pointing devices should be reliable and rugged, with the ability to be transported to a variety of locations. Current track ball devices do not satisfy these long-felt needs and are also quite cumbersome since they require practiced dexterity by the user as he interacts with the device.

Other types of pointing or input devices have been employed in the art. U.S. Pat. No. 3,886,311, Rodgers et al., discloses a writing pen for detecting time varying electrostatic field components. The writing pen disclosed in Rodgers et al. is used in conjunction with a writing tablet which generates an electrostatic field. The Rodgers et al. patent discloses an X-Y grid having a writing surface overlaying the grid and an active stylus which writes on the grid in the same manner as a ball point pen. See column 2, lines 63, through column 3, line 7.

Other examples of stylus-type or "tablet" input devices are disclosed in U.S. Pat. No. 4,672,154, also to Rodgers et al. The second Rodgers et al. patent discloses a cordless stylus which emits a directional electric field from the tip of a conductive pen cartridge. The pen tip is capacitively coupled to a digitizer tablet having an X-Y coordinate system. The pointing device disclosed in the second Rodgers et al. patent may also function as a mouse. See column 1, lines 65 through 68. Both the stylus embodiment and the mouse embodiment disclosed in the second Rodgers et al. patent are both active devices which emit electrostatic fields that interface with the digitizer tablet.

The Rodgers et al. patents disclose digitizing styluses and mouse pointing devices which require a separate rolling surface. Furthermore, both of these patents disclose devices which are active and emit electrostatic fields to interact with the digitizing tablet in order to input data to a computer. Since the devices disclosed in both Rodgers et al. patents are active, the stylus is either attached to the tablet by a wire or contains a replaceable power source such as a battery. In either case, the user is required to grasp a bulky item in order to use the device. Thus, the devices disclosed in the Rodgers et al. patents do not satisfy a long-felt need in the art for pointing and input devices which can be conveniently and efficiently used for a variety of portable and desktop applications.

It has been known in the art to use tactile sensing devices to provide data input. See U.S. Pat. No. 4,680,430, Yoshikawa et al. The Yoshikawa et al. patent discloses a coordinate detecting apparatus for determining the coordinate position data of a point on a plane indicated by the touch of a finger tip or other load. Yoshikawa et al. teaches an analog type apparatus which uses a resistive film through which the coordinate position of a point is detected. The point's coordinate position is indicated by applying a load impedance to the position. See column 3, lines 8 through 22.

Tactile devices such as those disclosed in Yoshikawa et al. exhibit a significant disadvantage since they require electrical contact between the finger tip and the device. When individuals possess long fingernails or have other objects about the fingers and hands, good electrical contact is prevented and the device does not function properly.

Other analog tactile devices also exist in the art. See, e.g., U.S. Pat. No. 4,103,252, Bobick. The Bobick patent discloses electrodes located on the boundaries of a sensing region. Human touch on an edge of an electrode produces a capacitive charge to vary the time constant of an RC network which is part of an oscillator. The variation in capacitance of the sensor changes the time constant of the RC network and results in a change in frequency in the output signal of the oscillator. See column 2, lines 8–20.

U.S. Pat. No. 4,736,191, Matzke, discloses a touch activated control device comprising individual conductive plates which form sectors of a circle. A user's touch on the dielectric layer overlaying the plates is detected by individually charging and discharging each of the sectors in the plates in a sequential manner to determine the increased capacitance of the sector. See column 2, lines 26 through 40.

Display devices which are touch sensitive have also been utilized in the art. See U.S. Pat. No. 4,476,463, Ng et al. The Ng et al. patent discloses a display device which locates a touch anywhere on a conductive display faceplate by measuring plural electrical impedances of the faceplate's conductive coating. The impedances are at electrodes located on different edges of the faceplate. See column 2, lines 7 through 12. The touch sensitive devices disclosed in Ng et al. are generally designed to overlay a computer display and provide positioning information.

The tactile input devices disclosed in the Bobick, Matzke et al. and Ng et al. patents do not satisfy a long-felt need in the art for tactile input devices which accurately and efficiently provide data input for computers and other instrumentation. The devices disclosed in the aforementioned patents fail to satisfy this long-felt need since they effectively only measure position as a fraction of the distance between electrodes located on the boundaries of a sensing region. This leads to measurement inaccuracies since the distance between electrodes is relatively large, thereby causing small errors in the measured fraction to result in large position errors.

Still other tactile sensing devices utilize a grid of electrodes to digitally determine an object's position somewhere on the grid. See U.S. Pat. No. 4,550,221, Mabusth, and U.S. Pat. No. 4,639,720, Rympalski et al. The Mabusth patent discloses a touch sensitive control device which translates touch location to output signals and which includes a substrate that supports first and second interleaved, closely spaced, non-overlapping conducting plates. The plates are aligned in rows and columns so that edges of each plate of an array are proximate to, but spaced apart from, the edges of plates of the other array. The first and second arrays are periodically connected in a multiplexed fashion to a capacitance measuring circuit which measures the change in capacitance in the arrays. In effect, the Mabusth patent discloses a grid of pixels which are capacitively coupled.

Similarly, the Rympalski et al. patent discloses an electronic sketch pad which contains a graphics input pad having an array of transparent capacitive pixels, the capacitance characteristics of which are changed in response to the passing of a conductive tipped stylus over the surface of the pad. The change in capacitance is sensed by buffers disposed along the columns of the pixel matrix as the rows are scanned at a prescribed scanning rate.

Neither the Mabusth patent nor the Rympalski et al. patent satisfy a long-felt need in the art for tactile input devices which exhibit good position resolution of an object. Since the aforementioned patents teach devices which utilize a grid of electrodes and which operate in a "binary" mode, i.e., measure position by examining each electrode and determining that an object is located or is not located at a point on the grid, the resolution of the position measurement is limited to, at best, a few times the grid resolution. This requires an extremely fine pattern of electrodes to achieve acceptable position resolution. However, a fine pattern of electrodes is extremely expensive and, in most cases, not practical. Therefore, the Mabusth and Rympalski et al. patents do not satisfy a long-felt need in the art for tactile sensing devices which can input data to computers or other instruments.

SUMMARY OF THE INVENTION

The aforementioned long-felt needs are met by methods and apparatus provided in accordance with this invention. An apparatus for data input is provided. The apparatus comprises pad means for sensing at least one object's position, the pad means having electrical balances responsive to the object's position, and measurement means operatively coupled to the pad means for measuring the electrical balances in the pad means.

Methods of measuring an object's position are further provided in accordance with the present invention. The methods comprise the steps of providing an electrically sensitive pad comprising insulator means having first and second sides for providing an insulating substrate to the apparatus, first electrode means electrically coupled to the first side of the insulator means for establishing an electromagnetic field, second electrode means electrically coupled to the second side of the insulator means for further establishing the electromagnetic field in cooperation with the first electrode means, synthesis means operatively coupled to the first electrode means and the second electrode means for selecting first electrode means and second electrode means to repeatedly synthesize virtual dipole electrodes. The steps of the methods further comprise measuring electrical balances between the plurality of first electrode means and the second electrode means, calculating the object's coarse position based on a least one target index, calculating the object's fine position based on the measured balances between the plurality of first electrode and second electrode means, and calculating the object's net position.

BRIEF DESCRIPTION OF THE DRAWINGS

FIG. 5(a) illustrates a simple virtual dipole electrode.

FIG. 5(b) illustrates a simple virtual dipole electrode wrapped around.

FIG. 6 illustrates cyclic virtual dipole electrodes.

DETAILED DESCRIPTION OF PREFERRED EMBODIMENTS

Figure 1:
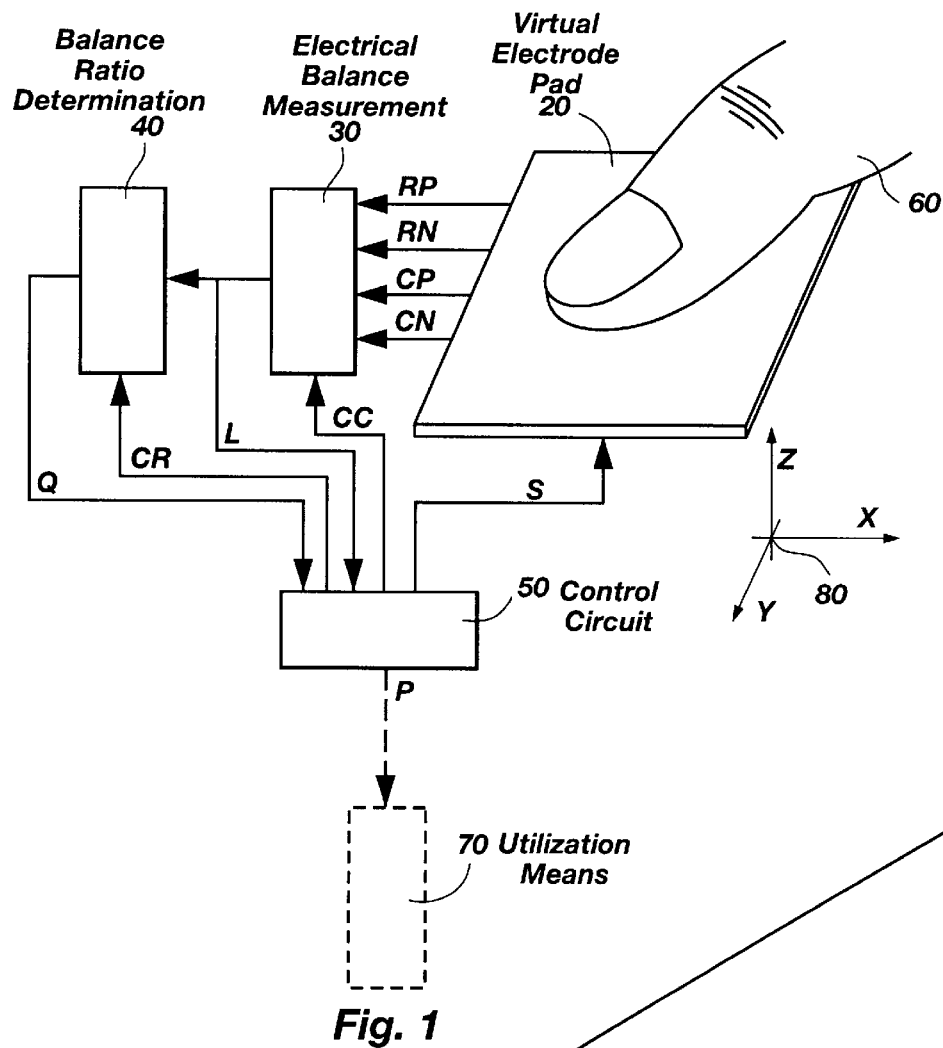
FIG. 1 is a block diagram of a touch sensitive control device provided in accordance with this invention.

Referring now to the drawings wherein like numerals refer to like elements, FIG. 1 is a touch sensitive input device provided in accordance with this invention, comprised of a virtual electrode pad 20, electrical balance measurement circuit 30, balance ratio determination circuit 40, and control circuit 50. In preferred embodiments, virtual electrode pad 20 is in the shape of a sheet. In further preferred embodiments, the virtual electrode pad 20 is capable of forming "virtual electrodes" at various positions on its top and bottom surfaces. The electrodes are denoted as "virtual electrodes" since separate conductive strips on the two sides of pad 20 are used to form single elements denoted "virtual electrodes." The virtual electrodes are connected to electronic circuitry capable of measuring the electrical balance between selected top virtual electrodes and selected bottom virtual electrodes.

In still further preferred embodiments, balance ratio determination circuit 40 is provided to determine the ratio of one balance measurement to another. Control circuit 50 selects appropriate electrodes for balance measurement and ratio determination. The control circuit 50 responds to balance ratios to calculate position information of the sensed object 60. This information may include position along 1 or 2 axes parallel to the electrode pad surface. Additional "proximity" information along an axis perpendicular to the surface of electrode pad 20 may also be determined from an appropriate balance measurement.

Position information determined by control circuit 50 is provided to a utilization means 70 which may be any of a variety of electronic or computer devices.

A finger 60 is shown located with its tip in close proximity to the top surface of electrode pad 20. The position of the finger tip over some region in the x and y directions may be sensed, as may its proximity in the z direction by virtual electrode pad 20. The sensed object 60 could also be a thumb tip, or any other conductive object. The coordinate axis 80 is shown for reference.

Figure 2:
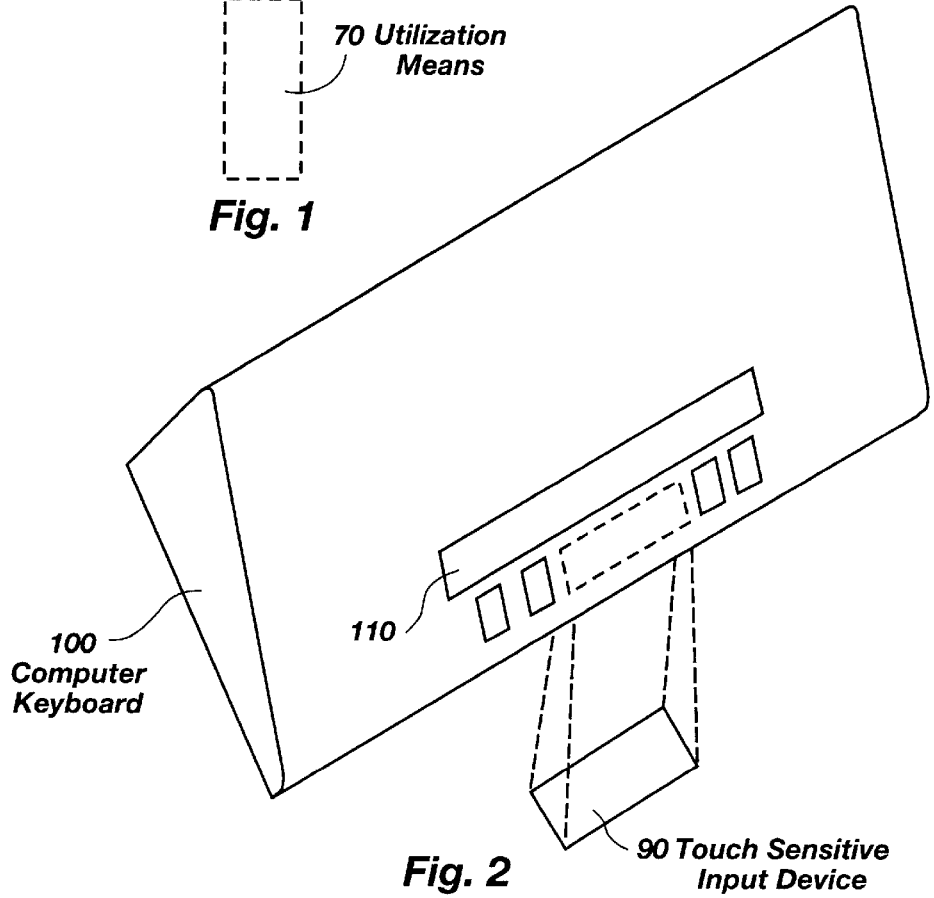
FIG. 2 shows a touch sensitive control device provided in accordance with this invention interfaced with a computer keyboard.

Referring to FIG. 2, a touch sensitive input device 90 provided in accordance with the present invention may provide information indicative of an operator's finger position to a computer, as an alternative to the function commonly performed by a computer mouse. An operator may draw, select commands, or manipulate graphically portrayed objects on a computer with touch sensitive input devices provided in accordance with this invention. The device 90 may be a separate pad which could be held in the hand, placed on a desktop, or in preferred embodiments built into a computer keyboard 100 positioned below the space bar 110 so an operator can manipulate it with his or her thumbs. In other preferred embodiments, the electrodes and insulator might be constructed from transparent materials for attachment to the viewing surface of a computer display screen.

The device 90 provides finger position information to any type of electronically controlled equipment. An operator could control the volume of a stereo, temperature of an oven, time for a cycle of an appliance, selection of a vending machine item, a "video game" electronic entertainment game, or the functions of electronic test or measuring equipment, for example, an oscilloscope. If a 1-axis form of the device is desired for an application, the electrode pad may be of a straight linear geometry. It could also be circular or cylindrical, having an operation like a common dial or potentiometer knob.

In preferred embodiments, the sensed object may be any substantially conductive object. With an electrode pad constructed on an appropriate scale, the device could sense the position of a nearby hand, person, automobile, or piece of machinery. The touch sensitive control devices provided in accordance with this invention could be further adapted for use as an "electronic blackboard."

Figure 3:
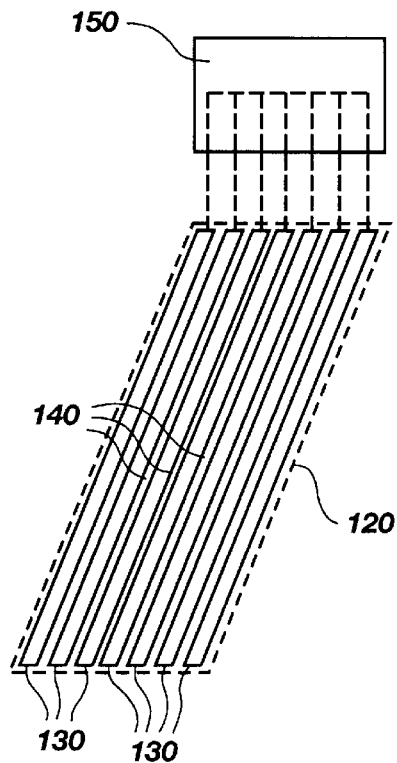
FIG. 3 illustrates synthesis of virtual electrodes.

Referring to FIG. 3, virtual electrode 120 is comprised of a number of electrode strips 130 deployed over an area. An electrode strip is a sheet conductive region. The strips are separated by insulating spaces 140 but are electrically connected together by electrode synthesis circuit 150. The area over which the connected strips 130 are deployed, including the area between strips 140, is defined as the area of the virtual electrode.

As defined and used throughout, the notation $A \vert B$ means A modulo B, that is, the remainder when A is divided by B. Square brackets are used to enclose indices, typically selecting one of a number of similar objects or points. For example, $C[i]$ denotes the "i-th column". All indices are to be taken with respect to an understood row or column modulus. For example, if there are M "columns", then $C[i+1]$ is to be interpreted as $C[(i+1) \vert M]$.

Figure 4:
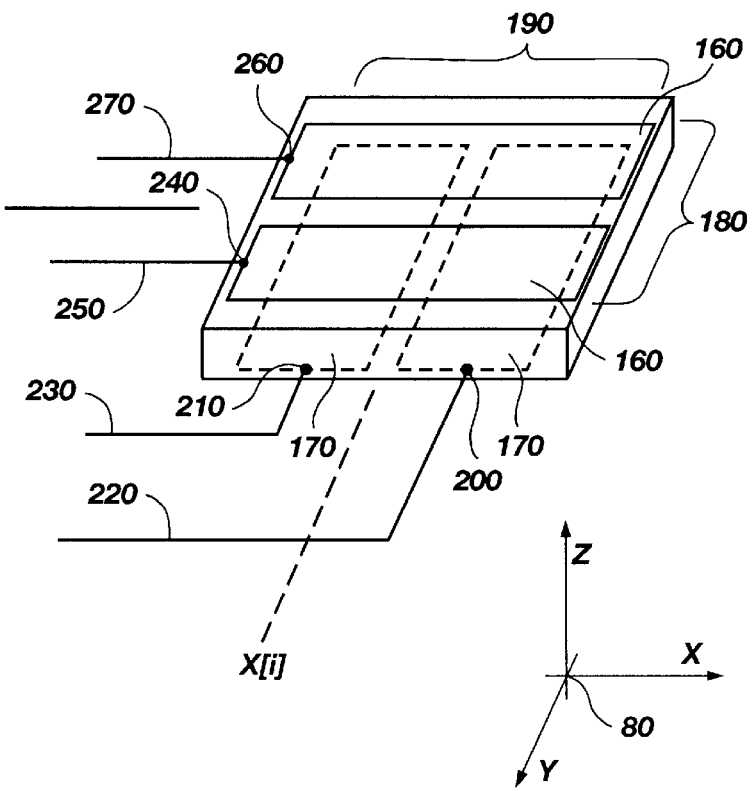
FIG. 4 shows synthesis of virtual dipole electrodes from virtual electrodes.

FIG. 4 shows a preferred embodiment of virtual electrode pad 20 with two "row" virtual electrodes 160 on the top side of the sheet and two "column" virtual electrodes 170 on the bottom side. In further preferred embodiments, each virtual electrode is rectangular in shape. The virtual electrodes have a "length" and a "width". The width of the row electrodes 160 are in the y direction with respect to the coordinate system 80, while the width of the column electrodes 170 are in the x direction. The two row virtual electrodes 160 form a row "virtual dipole electrode" (VDE) labelled $R[j]$ at 180. A column VDE labelled $C[i]$ at 190 is also formed.

In still further preferred embodiments, a VDE consists of two virtual electrodes of equal area located along side each other. A virtual electrode extending to the pad edge may "wrap around" to the opposite side's edge. The component virtual electrodes of the VDE are referred to as the "positive" and "negative" halves of the VDE. The location (along the axis in the width direction in the present example is greater for the positive half than for the negative half of the VDE. The positive half of $C[i]$ is denoted by $C[i]$<p> at 200 and the negative half by $C[i]$<n> at 210. $C[i]$<p> is connected to wire CP at 220 and $C[i]$<n> to wire CN at 230. Similarly, $R[j]$<p> at 240 is connected to RP at 250 and $R[j]$<n> 260 to RN at 270.

The "location" of a VDE is defined as the coordinate in the width direction of a location line, i.e., equidistant between the two component virtual electrodes. Column VDEs $C[0]$ . . . $C[M-1]$ are located at $x[0]$ . . . $x[M-1]$, respectively. Row VDEs $R[0]$ . . . $R[N-1]$ are located at $y[0]$ . . . $y[N-1]$, respectively. The "VDE spacing" is the distance between adjacent row (or column, as appropriate) VDE locations. Typically, VDE width is greater than VDE spacing and therefore VDEs may overlap at adjacent locations.

Referring to FIGS. 5(a) and 5(b), a preferred embodiment of two simple column VDEs as described above is shown. There is a single location line 280 with a negative VDE half 290 on the left and a positive half 300 on the right. Each VDE covers essentially the entire virtual electrode pad 20. In FIG. 5(b), the location line is not in the center of the pad. The <n> virtual electrode 290 extends to the left edge of the pad and wraps around to the right edge at 310. In other preferred embodiments, a VDE may have only a positive half wherein the area of the negative half and any mutual capacities to the negative half are defined to be zero.

FIG. 6 illustrates another preferred embodiment of a VDE called a "cyclic" column VDE. A cyclic VDE consists of a "fundamental" VDE and additional VDEs located periodically along the axis. All the <n> virtual electrodes 290 are electrically connected together to the CN wire 230. Similarly, all <p> virtual electrodes 300 are connected to CP at 220. The number of component VDEs (including the fundamental VDE) in a cyclic VDE is defined as the "multiplicity". The multiplicity is three for the example shown. The location 280 of the fundamental VDE is taken to be the location of the entire cyclic VDE. This location has the lowest coordinate of all the component VDES. Simple and cyclic row VDEs are analogous to the column VDEs described here.

Simple VDEs can be considered to be a special case of cyclic VDEs having multiplicity equal to one. The advantage of using higher multiplicity is increased accuracy compared to a virtual electrode pad of the same size and same number of cyclic VDEs but lower multiplicity. Assume the former has multiplicity A and the latter multiplicity B, where A is greater than B. The VDE spacing of the former will be the fraction B/A of the latter. Greater accuracy can be realized with the former due to the smaller VDE spacing.

Multiplicity greater than one implies the sensed object's absolute position can not be determined unambiguously. Position can be determined relative to the location of one component VDE, but there is no way to determine which component VDE. In many cases only relative position (that is, a change in position) needs to be sensed. With multiplicity greater than one, position should be measured frequently enough that the sensed object never moves more than half the VDE spacing from one measurement to the next. In this fashion, relative position change can be unambiguously determined. A multiplicity of one may be used if absolute position must be measured. Another solution is to use two different periodic VDEs with different VDE spacings.

Figure 7:
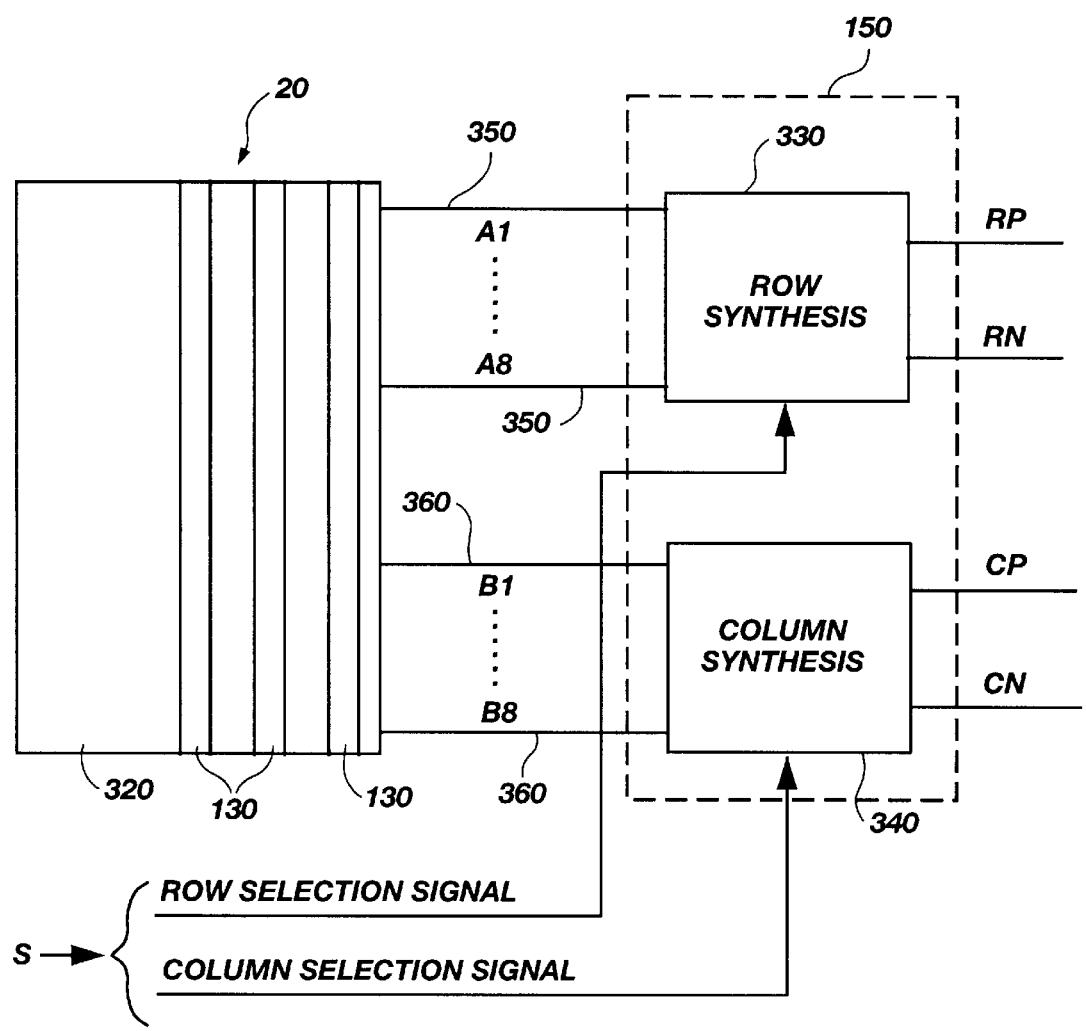
FIG. 7 is a block diagram of a virtual electrode pad and row and column synthesis circuitry.

Referring to FIG. 7, virtual electrode pad 20 comprises a substrate 320 and a plurality of electrical strips 130 on both sides of the substrate 320. In preferred embodiments, substrate 320 is an insulator. Electrode synthesis circuit 150 comprises row synthesis circuit 330 and column synthesis circuit 340. In further preferred embodiments, electrode pad 20 is connected to row synthesis circuit 330 through lines A1 through A8, shown generally at 350. Similarly, electrode pad 20 is connected to column synthesis circuit 340 through lines B1 through B8, shown generally at 360. In still further preferred embodiments, there are eight electrode strips on the top side of pad 20.

On command from control means 50, the electrode synthesis circuit 150 connects selected electrode strips to wires CN, CP, RN and RP to form one row and one column VDE on respective sides of the virtual electrode pad. A signal, S, from control means 50 is input to row synthesis circuit 330 and column synthesis circuit 340 and commands the virtual electrode pad 20 to select one row VDE and one column VDE. The location of each VDE is varied according to the requirements of a control algorithm. Both halves of each VDE are connected to the electrical balance measurement means 30. This connection is via wires RN and RP connected to the positive and negative halves, respectively, of the row VDE; and via wires CN and CP connected to the positive and negative halves of the column VDE. In preferred embodiments, the electrical measurement accomplished is a capacitive measurement between the electrode strips.

Figure 8A:
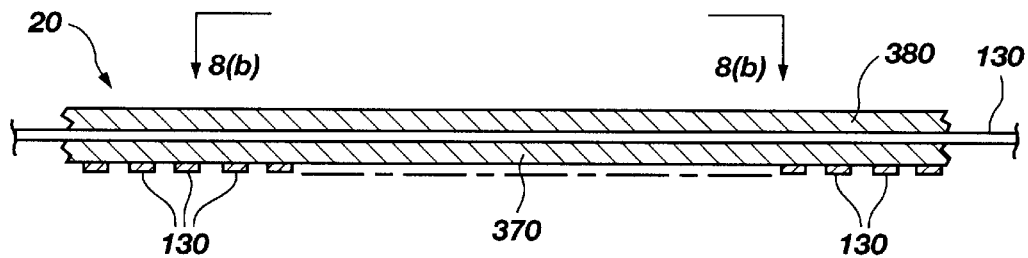
FIG. 8(a) shows an elevation view of a virtual electrode pad provided in accordance with this invention.
Figure 8B:
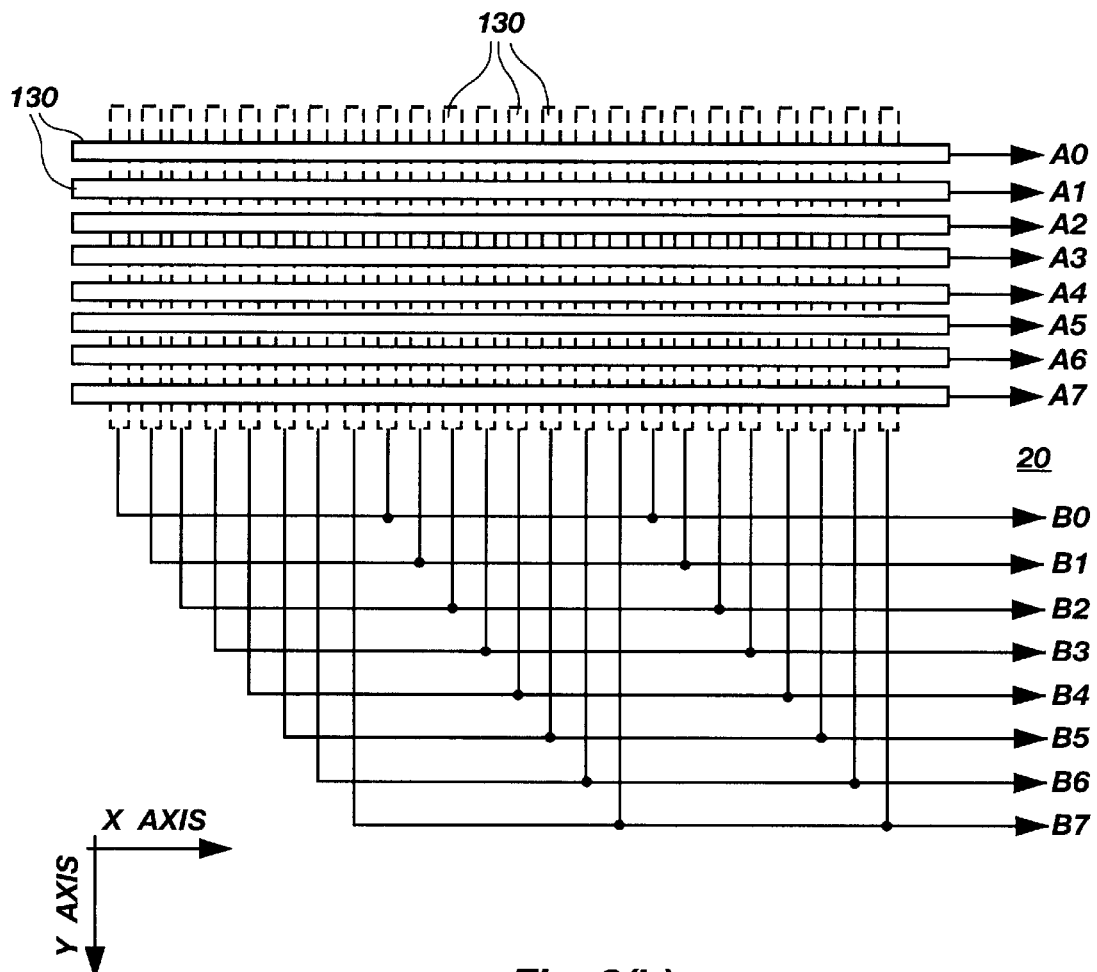
FIG. 8(b) is a plan view of a virtual electrode pad taken along the 8(b) line of FIG. 8(a).

FIGS. 8(a) and 8(b) show virtual electrode pad 20. Referring to FIG. 8(a), flat electrode strips 130 are present on the top and bottom of separator insulating substrate, shown generally at 370. On the top surface of electrode pad 20 is a thin overlay insulator 380 which prevents a sensed object from making electrical contact with electrode strips 130 and substrate 370. It also protects the electrode strips from corrosion and wear.

In further preferred embodiments, pad 20 has overall dimensions of about 1.0 inch high by 3.5 inches wide by 0.08 inch thick. Overlay insulator 380 is a 0.02 inch thick MYLAR sheet, and separator insulator 370 is a 0.06 inch thick epoxy-glass printed circuit board material. Electrode strips 30 are 0.04 inch wide copper traces on 0.2 inch centers fabricated on both sides of the separator insulator using standard printed circuit board techniques. Dimensions may be varied considerably while still achieving good functionality. The width of the traces, spacing between the traces, and thickness of the circuit board insulator and overlay insulator may be selected for the particular application and object being sensed. The abovementioned dimensions give good results for a human finger tip.

Referring to FIG. 8(b), there are eight electrode strips on the top side of the separator insulator 370 perpendicular to the y axis. Wires labelled A0 through A7 are attached to these 8 electrode strips. In still further preferred embodiments, there are twenty-four electrode strips on the bottom of separator insulator 370 perpendicular to the x axis. The twenty-four electrode strips are connected to wires labelled B0 through B7 as shown. Connection of three column electrode strips to each column wire is consistent with multiplicity of three. The multiplicity is one for the rows.

Figure 9:
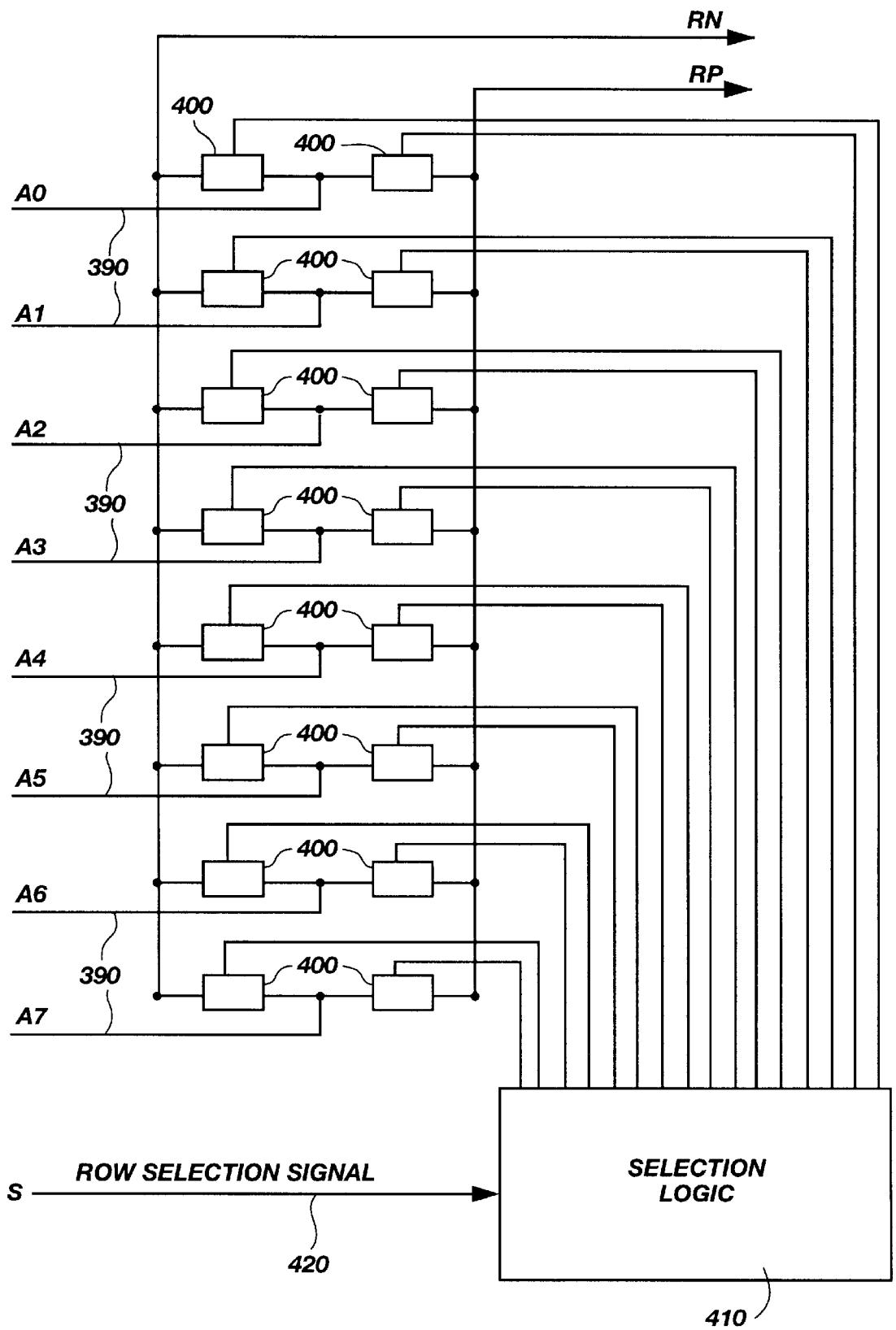
FIG. 9 is a block diagram of row and column synthesis circuitry.

FIG. 9 illustrates a preferred embodiment of an implementation of row virtual electrode synthesis circuit 330. Each electrode strip wire A0 through A7, shown generally at 390, is connected to a pair of electronic switches at 400. In preferred embodiments, electronic switches 400 are CMOS analog switches. One or the other switch of each pair is electrically conducting. The electrically conducting switch connects the associated electrode strip to either wire RN or RP, depending on whether that strip is to be part of a VDE negative or positive half.

Each switch 400 is controlled by the selection logic block shown at 410. The selection logic block 410 responds to the row selection signal 420 which is a component of signal S. The following selection table shows selection logic for synthesis of all possible row VDEs in the pad of FIG. 8.

SELECTION TABLE

| | \multicolumn{8}{c}{Selection Signal} |
|---|---|---|---|---|---|---|---|---|
| | R[0] | R[1] | R[2] | R[3] | R[4] | R[5] | R[6] | R[7] |
| A0: | RP | RN | RN | RN | RN | RP | RP | RP |
| A1: | RP | RP | RN | RN | RN | RN | RP | RP |
| A2: | RP | RP | RP | RN | RN | RN | RN | RP |
| A3: | RP | RP | RP | RP | RN | RN | RN | RN |
| A4: | RN | RP | RP | RP | RP | RN | RN | RN |
| A5: | RN | RN | RP | RP | RP | RP | RN | RN |
| A6: | RN | RN | RN | RP | RP | RP | RP | RN |
| A7: | RN | RN | RN | RN | RP | RP | RP | RP |

In this way, one of eight possible VDEs, R[0] through R[7], are selected to be synthesized from electrode strips on the pad. The circuitry for columns may be identical to that for rows.

The pad dimensions, number of electrode strips to form a VDE, and multiplicity of VDEs along each axis may be varied. Some electrode strips can be unconnected when synthesizing a VDE. This provides additional spacing between VDE halves. The pad might be formed into a sphere, cup, cylinder, section of any of these, or other non-planar shape. The axes on the two sides of the pad need not be orthogonal. Axis systems other than rectangular coordinates might be used. With a radial coordinate system, "ring" virtual electrodes (directly analogous to the row virtual electrodes described above) would be shaped as rings while "wedge" virtual electrodes (directly analogous to the column virtual electrodes described above) would be shaped in a "pie-section."

The electrical balance measurement circuit 30 measures an electrical quantity between virtual row and column electrodes in the virtual electrode pad 20 defined as the "balance." Referring to FIG. 1, the electrical balance measurement circuit is connected to pad 20 by wires RP, RN, CP, and CN. In preferred embodiments, the electrical balance measurement circuit measures the capacitive balance between the virtual row and column electrodes. Thus, the terms electrical balance measurement and capacitive balance measurement are used interchangeably throughout.

It will be recognized by those with skill in the art that other electrical quantities responsive to a sensed object position such as, but not limited to, inductance, could be measured with input devices provided in accordance with this invention. Thus, the term "electric field" as used throughout is herein defined to mean any electromagnetic field, including electrostatic and magnetic fields. The capacitive balance measurement circuit outputs a signal which is responsive to the capacitive balance. This signal is utilized by the balance ratio determination circuit 40 and by the control circuit 50. The output signal might be a voltage utilized directly in an analog voltage form, or might be converted to digital form by an analog-to-digital converter.

To understand capacitive balance as it is used throughout, first define $M(A,B)$ to denote the well-known mutual capacitance between virtual electrodes A and B when all other electrodes in the pad are grounded. $M(C[i]<p>, R[j]<n>)$, for example, denotes the mutual capacitance between the positive half of VDE C[i] and the negative half of VDE R[j]. Then define the capacitive balance between VDEs C[i] and R[j], $L(C[i],R[j])$ to be given by:

$$L(C[i], R[j]) = Kfg * \{M(C[i] <p>, R[j] <n>) -$$
$$M(C[i] <p>, R[j] <p>) + M(C[i] <n>, R[j] <p>) -$$
$$M(C[i] <n>, R[j] <n>)\}.$$

Kfg is a constant scale factor which, in a preferred embodiment, depends on reference signal amplitude and amplifier gain of the electrical balance measurement circuit 30. Balance is a useful electrical quantity because it is indicative of the position of a conductive object, as described herein.

Figure 10A:
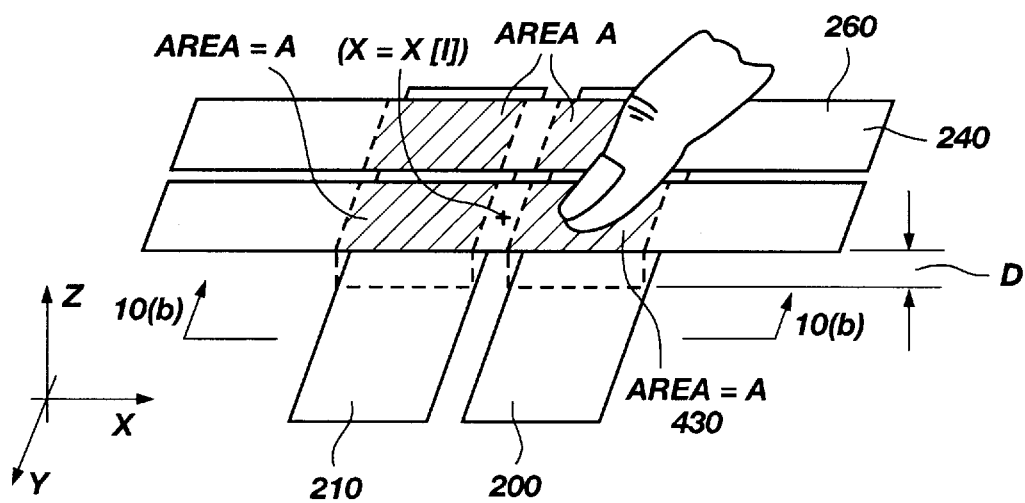
FIG. 10(a) illustrates object position sensing with a touch sensitive control device provided in accordance with this invention.
Figure 10B:
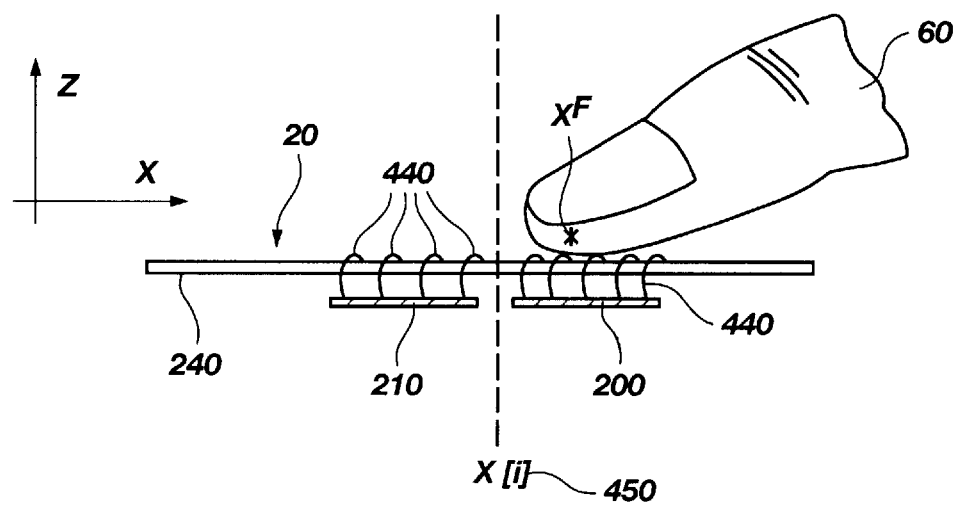
FIG. 10(b) shows object position sensing taken along the 10(b) line of FIG. 10(a).

Referring to FIG. 10(*a*), sensed object 60 is above the virtual electrode pad 20 with VDEs synthesized appropriate to the object's x position. The location of the object is at coordinates (xF, yF, zF). The object's position is related to a weighted average location of all points on the surface of the object, with greater weight given to those points closer to pad 20. A row VDE, R[j], is located with its positive half R[j]<p> 240 roughly centered in the y direction underneath the sensed object.

A column VDE, C[i], is located at x[i] near the x position of the sensed object. R[j] is called the "base" VDE and C[i] is the "target" VDE with respect to this measurement. The row and column VDEs are connected to RN and RP, and CN and CP, respectively. The separator insulator between base and target has a thickness D. The overlap between C[i]<p> and R[j]<p> is of an area, A, shown at 430, which equals the area of each of the other three overlaps between the C[i] and R[j] electrode halves.

FIG. 10(*b*) illustrates this situation from a side view along the x axis. Finger tip 60 is shown as a representative sensed object positioned at xF. As is well known from the theory of parallel plate capacitors, $M(C[i]<p>,R[j]<p>)=A*E/D$, approximately, where E is the dielectric constant of the separator insulator. The same expression applies for each of the other three mutual capacities between the C[i] and R[j] electrode halves. All four mutual capacities are approximately equal. These approximations neglect an addition to $A*E/D$ due to coupling of fringe electrostatic field lines shown at 440. If there were no finger tip present, the fringe field for all four would be equal. This balance would result in the exact equality:

$$L(C[i],R[j])=0.$$

A conducting object, such as finger tip 60, in close proximity upsets this balance. The finger tip, shown here positioned at xF>x[i] at 450, intercepts more of the fringe field of C[i]<p> than of C[i]<n> resulting in the inequality:

$$M(C[i]<p>,R[j]<p>)=M(C[i]<p>,R[j]<n>).$$

The finger tip does not substantially influence the fields coupled to R[j]<n> since the finger tip's y position is over R[j]<p> instead of R[j]<n>. Thus:

$$M(C[i]<n>,R[j]<p>)=M(C[i]<n>,R[j]<n>).$$

The net effect is that $$L(C[i],R[j])>0$$

for the finger tip positioned at xF>x[i]. By similar analysis, for xF=x[i], balance is preserved and $L(C[i],R[j])=0$. Similarly, for xF<x[i], $L(C[i],R[j])<0$.

Figure 11:
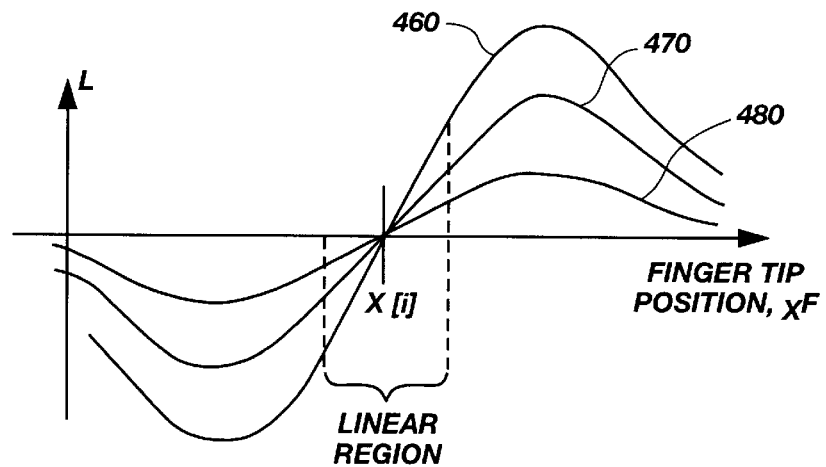
FIG. 11 is a graph of electrical balance versus position for a sensed object.

FIG. 11 plots the balance L, between the base and target VDEs for the situation of FIGS. 10(*a*) and 10(*b*) as a function of finger tip position xF. Plot 460 is for the case of the finger tip centered over the base VDE positive half (yF=y0), and as close to the pad as is possible (zF=z0). This case gives the largest magnitude change with position. Other plots 470 and 480 illustrate different y or greater z. The magnitude of the change is less in these cases since the finger intercepts fewer fringe field lines. In all cases, there is a region of xF around xF=x[i] where L is essentially a linear function of xF. This means that $L=K(yF,zF)*(xF-x[i])$ for some slope K which is dependent on yF, zF, and Kfg, as well as electrode, and sensed object geometries.

Figure 12:
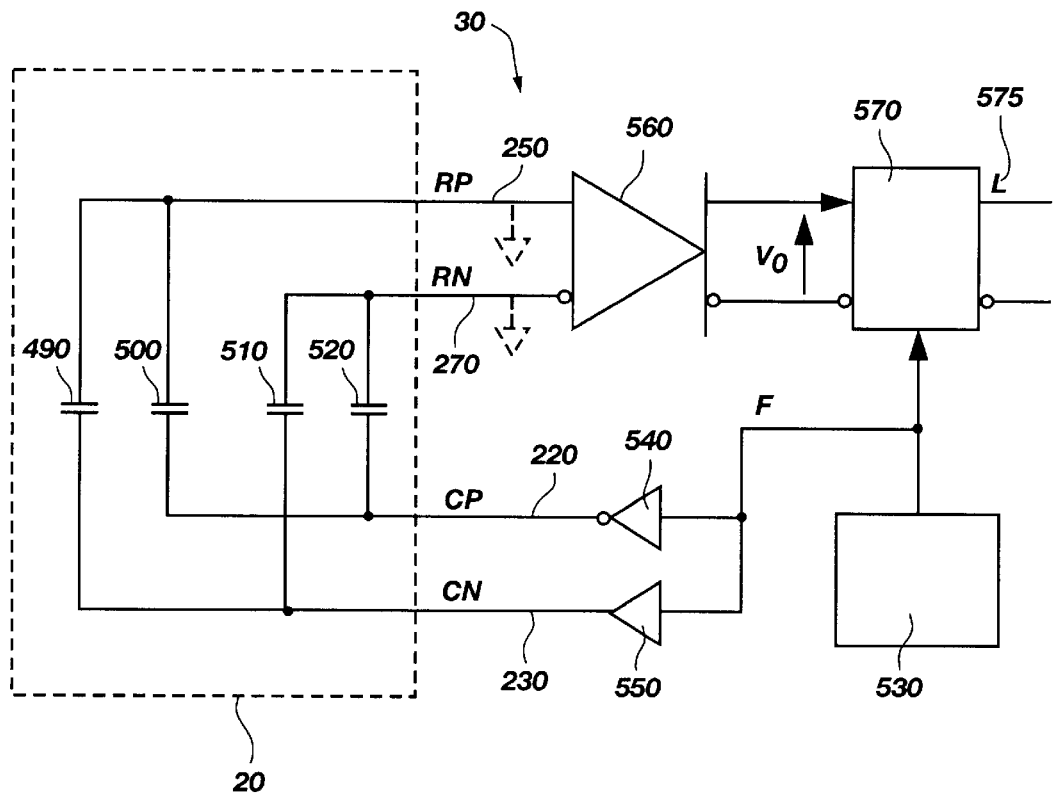
FIG. 12 illustrates a preferred embodiment of the electrical balance measurement circuit of FIG. 1.

FIG. 12 is a block diagram of a preferred embodiment of electrical balance measurement circuit 30. Also shown is a simplified electrical model of virtual electrode pad 20 connected to the capacitive balance measurement circuit 30 via wires RP 250, RN 270, CP 220, and CN 230. This model consists of 4 capacitors representing the mutual capacities M(C<n>,R<P>) 490, M(C<p>,R<p>) 500, M(C<n>,R<n>) 510 and M(C<p>,R<n>) 520 between halves of the base and target VDEs. The reference signal source 530 generates an alternating current (AC) reference signal, F, with a frequency substantially higher than the frequency at which position measurements are to be made.

In preferred embodiments, this frequency is about 140 KHz. For human finger tip sensing, frequencies from 20 KHz to 500 KHz will give acceptable results. Possible wider frequency ranges are possible when other objects are sensed.

The reference signal 530 goes to a pair of drivers. One driver 540 is an inverting type and drives the positive half of the synthesized column VDE via wire CP. The other driver 550 is a non-inverting type and drives the negative half via wire CN. CN 230 is thus driven with an in-phase version of F while CP 220 is driven with negative F (−F).

Wires RP 250 and RN 270 connect the positive and negative halves of the row VDE to non-inverting and inverting inputs, respectively, of a differential charge amplifier 560. Differential charge amplifier 560 maintains RP and RN at an AC virtual ground so that the AC voltage across each mutual capacitance 500 or 520 is −F and the AC voltage across each mutual capacitance 490 or 510 is +F. The amount of charge coupled onto RP is F*M(C<n>,R<p>) −F*M(C<p>,R<p>). The amount onto RN is F*M(C<n>, R<n>)−F*M(C<p>,R<n>).

The charge amplifier 560 produces an AC differential output voltage, Vo, equal to a gain factor, G, times the charge coupled onto RP minus that on RN. This yields the following relationship:

$$Vo=(F*G)*\{M(C\!<\!n\!>,R\!<\!p\!>)-M(C\!<\!p\!>,R\!<\!p\!>)+M(C\!<\!p\!>,R\!<\!n\!>)-M(C\!<\!n\!>,R\!<\!n\!>)\}=L(C,R).$$

Vo is the balance between C and R, denoted herein as L(C,R). Both G and the magnitude of F are constant scale factors. The product (F*G) is the scale factor, Kfg, in the above definition of the balance, L.

In preferred embodiments, Vo feeds into a double balanced synchronous detector 570 for measurement. The detector 570 also uses input signal F as a reference. Detector 570 recovers the amplitude of a signal synchronized to reference signal F in the presence of electrical noise signals having much greater amplitude. This noise rejection is important since the amount of charge coupled across the mutual capacitances 490, 500, 510 and 520 of virtual electrode pad 20 may be very small in magnitude. The output of the charge amplifier 560 therefore consists of a significant noise component, N, in addition to the desired signal. The output of charge amplifier 560 can thus be written as:

$$Vo'=Vo+N=L(C,R)+N.$$

The output of the detector 570 is a signal proportional to the component of Vo which is synchronous with the reference signal F. Since the noise N is not synchronized to F, it does not affect the detector output signal 575, which is therefore a direct measurement of L(C,R). The signal L at 575 can be encoded by any of a number of well known means, for example, in digital format or with a single ended or double ended voltage, current, or charge. The use of double balanced detector 570 minimizes noise and inaccuracy. In further preferred embodiments, a single balanced detector may be used.

Figure 13:
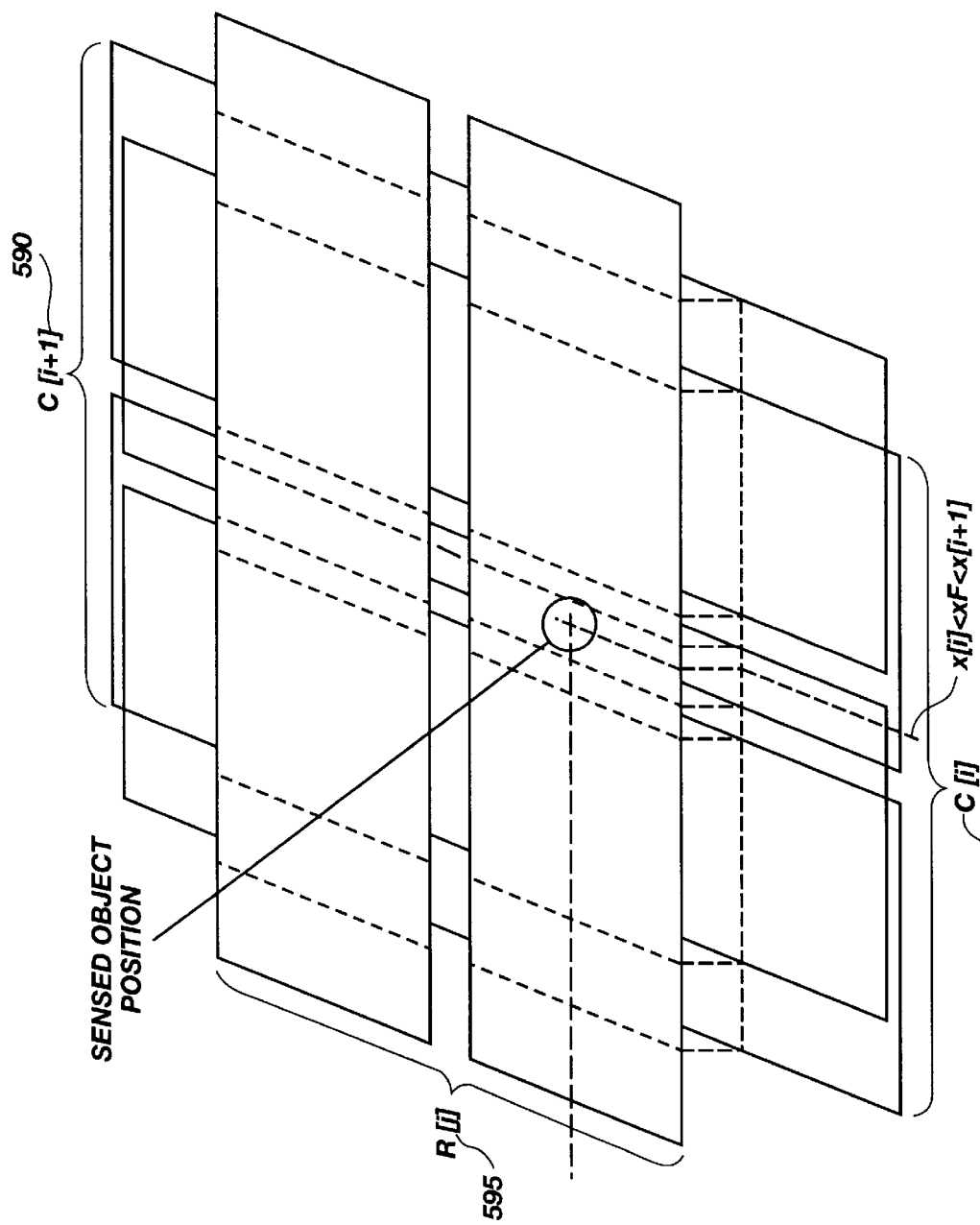
FIG. 13 is a virtual dipole electrode pad on which a single row virtual dipole electrode and two column virtual dipole electrodes are synthesized.

Referring to FIG. 13, virtual electrode pad 20 has two column VDEs, C[i] 580 and C[i+1] 590 at adjacent locations, formed on the bottom side of the pad. A row VDE, R[j] 595 is formed on the top side. The position of a sensed object is also indicated, although the object itself is not shown. The object's x position, xF, is between the locations of the two column VDEs, x[i] and x[i+1].

Figure 14:
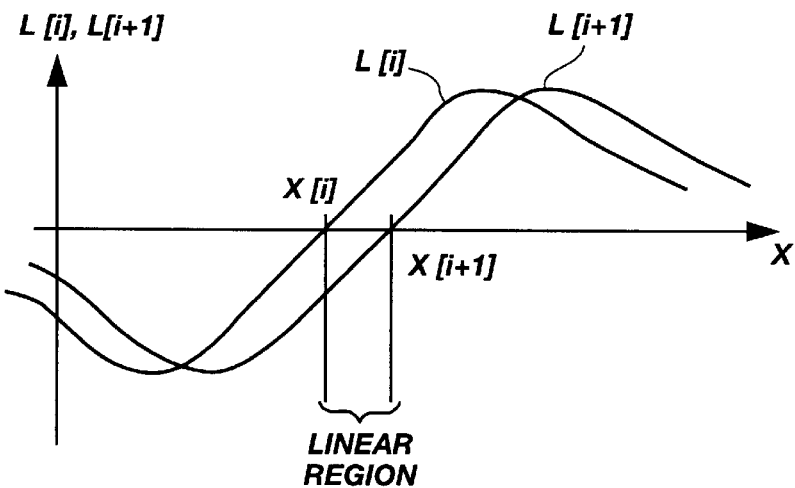
FIG. 14 is a graph of balances versus object position for the arrangement of FIG. 13.

FIG. 14 illustrates the variation of two balances measured in the pad 20 of FIG. 13. Each balance varies with the xF position of a sensed object. L[i] is the balance between base R[j] and target C[i]. L[i+1] is the balance between R[j] and C[i+1]. FIG. 11 showed the general linear nature of capacitive balance L, responsive to the object's xF position. The slope, K, of the general response varies with object yF and zF position and also includes the effect of the scale constant Kfg described above. Both L[i] and L[i+1] in FIG. 14 are essentially linear over the region between x[i] and x[i+1]. The slope constant, K, is essentially the same for both measurements. The measurements are expressed as:

$$L[i]=K*(xF-x[i]), \text{ and}$$

$$L[i+1]=K*(xF-x[i+1]).$$

In preferred embodiments, a balance ratio, Q[i], can be defined as:

$$Q[i]=L[i]/(L[i]-L[i+1]).$$

Other expressions for Q[i] may be developed which are functionally equivalent. From the above expressions for L, Q[i] can be rewritten as:

$$Q[i]=(xF-x[i])/(x[i+1]-x[i]).$$

Q[i] varies linearly from a value of zero for an object at xF=x[i] up to one at xF=x[i+1]. Algebraic rearrangement gives an expression for position xF as:

$$xF=Q[i]*(x[i+1]-x[i])+x[i].$$

It is advantageous to calculate Q[i] so the position xF can be determined independently of yF or zF. The balance ratio Q[i], is calculated by balance ratio determination circuit 40 using successive capacitive balance measurements L[i] and L[i+1].

The discussion regarding FIGS. 13 and 14 and the definition of balance ratios all contemplated a preferred embodiment in which two adjacent VDES, with indices [i] and [i+1] are used to develop a balance ratio. Two non-adjacent VDEs, e.g., with indices [i] and [i+n] could also be used wherein n is considered an index offset.

Referring again to FIG. 1, control circuit 50 accepts balance measurements, L, and ratios, Q, from balance measurement circuit 30 and ratio determination circuit 40. Control circuit 50 generates a selection signal, S, which is provided to virtual electrode pad 20. Signal S contains row and column selection components. In preferred embodiments, control circuit 50 is a microprocessor, microcontroller, or other digital logic circuitry.

Control signal S specifies one row VDE and one column VDE to be formed on pad 20 at any particular moment. Thus, the control circuit specifies or selects the particular column and row VDE at given times. Control circuit 50 also provides signals to balance measurement circuit 30 and balance ratio determination circuit 40 directing these two components to perform measurements and calculations. It also provides position signals, P, to utilization means 70.

As herein defined, the object's "coarse" position means position with resolution equal to the distance between adjacent VDEs. The object's "fine" position means position with resolution some number of times greater than the coarse position. The particular multiple of the coarse resolution is a function of the capacitive balance measurement resolution, balance ratio determination resolution, and the degrading effects of electronic noise. In preferred embodiments, this multiple is 128.

Assume that one of M column VDEs and one of N row VDEs can be selected from the pad 20. In preferred embodiments, M=8 and N=8. Each VDE covers the entire surface of the pad by wrapping around as described and shown in FIG. 5(b).

Assume i and j are VDE indices taken from what may be called the set of "normal" indices. Row VDE R[i+N/2] is the same as R[i] with positive and negative halves interchanged. Similarly C[j+M/2] is an interchanged version of C[j]. Interchanging positive with negative halves of both the row and the column VDEs does not effect a balance measurement. This will be appreciated by recalling the definition of balance, L. Since operation is based on balance measurements, all normal column and row indices can be consistently increased by M/2 and N/2, respectively, to give alternate indices. Alternate indices correspond to coarse positions which are consistently offset by M/2 times the column VDE spacing and N/2 times the row VDE spacing.

In further preferred embodiments, it is not possible to determine if normal or alternate indices are being used at any particular time, but the type of indices being used will not switch while a sensed object remains in proximity to the pad. In still further preferred embodiments, position change is the same with normal and alternate indices. Fortunately, in many applications only a change in position is important. If absolute position must be determined, an additional measurement, L', that is sensitive to interchanging positive and negative halves can be defined by the expression:

$$L'(C[i], R[j]) = Kfg * \{M(C[i] <p>, R[j] <n>) +$$
$$M(C[i] <p>, R[j] <p>) - M(C[i] <n>, R[j] <p>) -$$
$$M(C[i] <n>, R[j] <n>)\}.$$

Measurement circuitry to determine L' is a variation of the circuitry used for determining L. The control means may be adapted to use L' and distinguish normal indices from alternate indices in preferred embodiments.

A goal of the control circuit is to perform repeated updating of base indices, IB and JB, and target indices, IT and JT, such that the sensed object position is roughly centered within the positive halves of VDEs C[IB] and R[JB], and located in intervals x[IT] to x[IT+1] and y[JT] to y[JT+1]. This relates to the coarse position of the object.

Figure 15:
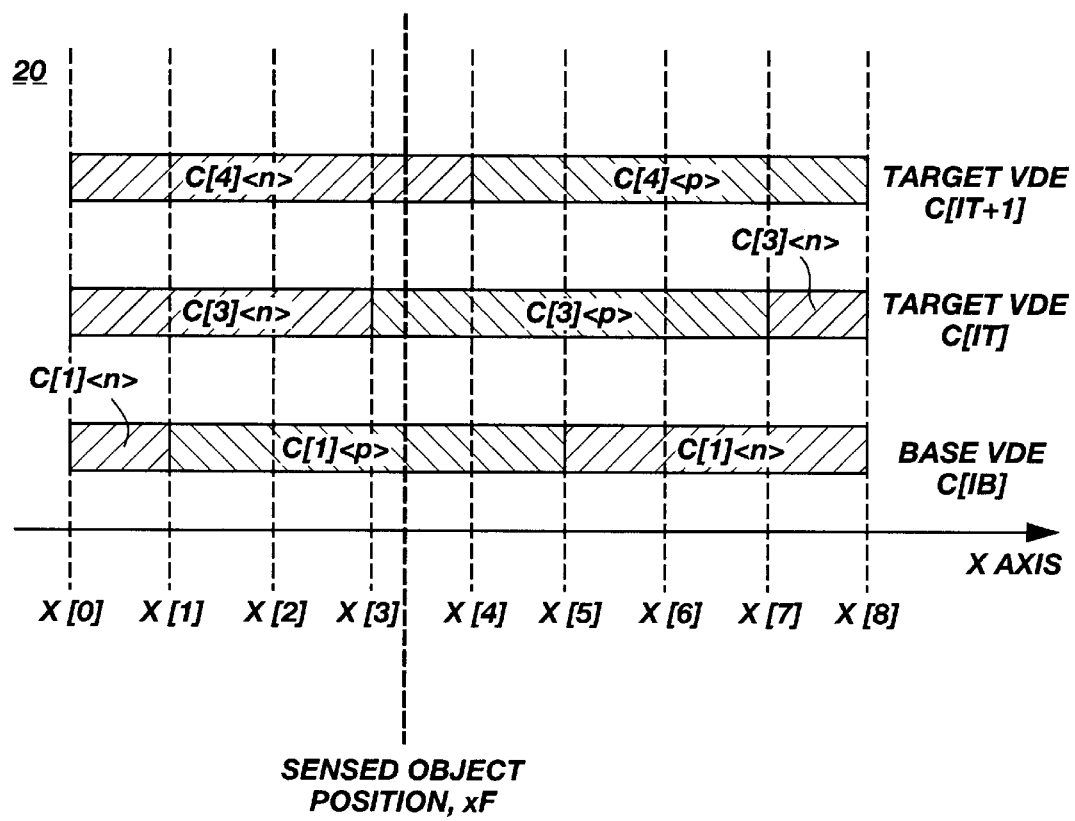
FIG. 15 shows target and base virtual dipole electrode extent with indices updated reflecting sensed object position.

Referring to FIG. 15, one possible xF object position and the extent of appropriate column VDEs is shown. In this example, IB=1 and IT=3. Position xF is located between x[3] and x[4], the respective locations of target VDEs C[3] and C[4]. Furthermore, xF is roughly centered within the positive half of base VDE C[1]. An example for the y position and row VDEs is analogous.

Figures 16, 17:
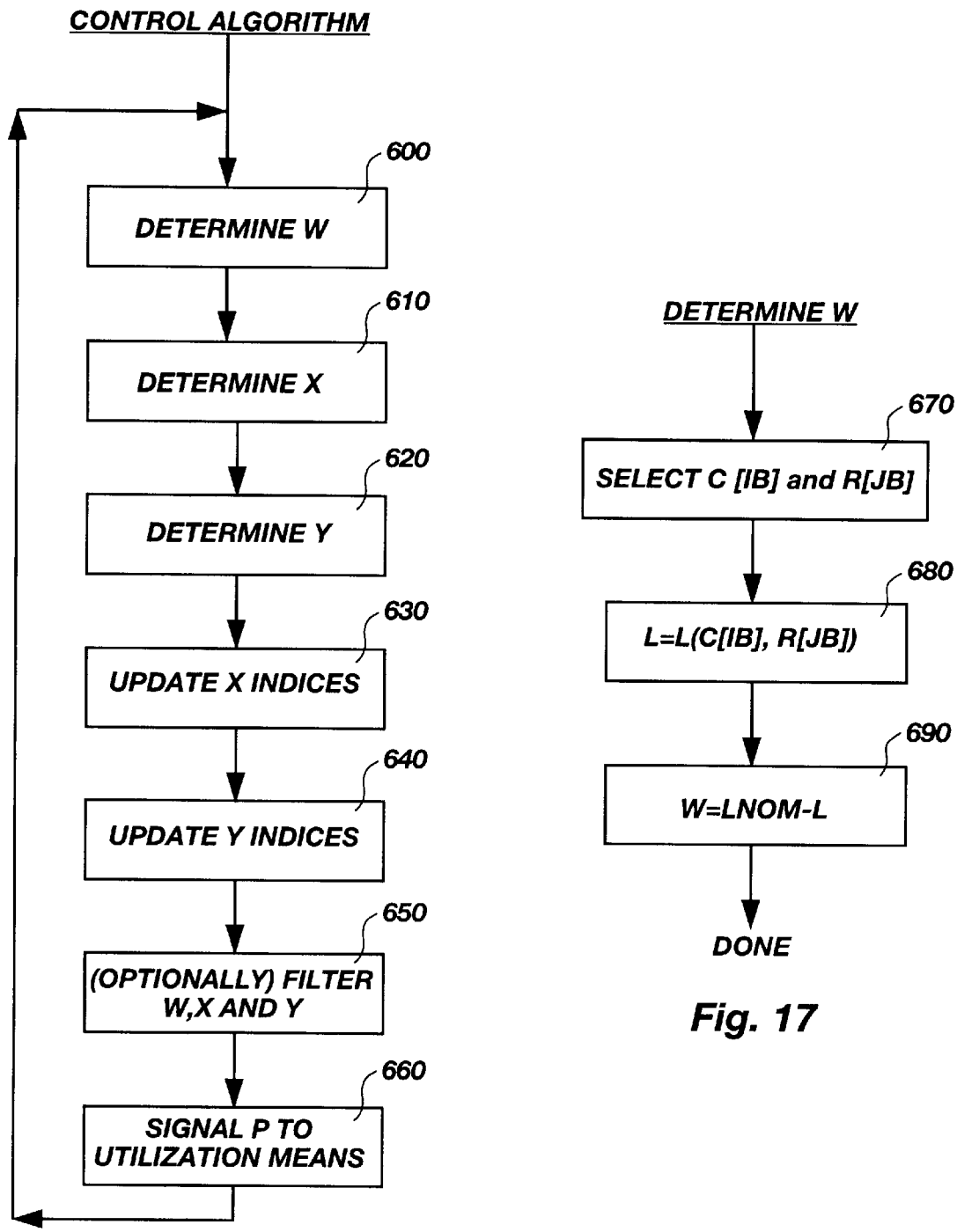
FIG. 16 is a preferred embodiment of a flow chart of a control algorithm provided in accordance with this invention.
FIG. 17 is a flow chart to determine the proximity of an object to a virtual dipole electrode pad.

Referring to FIG. 16, a flow chart of a preferred embodiment of an algorithm executed by the control means is shown. At step 600, the control means determines the proximity, W, of the sensed object to the pad generally in the z direction. The object's position is determined at step 610 and the object's y position is determined at step 620. The control means updates the x indices IB and IT at step 630 and the y indices JB and JT at step 640.

Signal filtering to reduce noise in the reported position, to vary the rate of reporting depending on position change activity, or to eliminate spurious position change or inaccuracies as the sensed object passes through the proximity threshold transition, is performed at step 650. Signal P is sent to a utilization means at step 660. One component of P indicates the proximity W, or closeness of contact, between the object to be sensed and the pad. If the proximity is sufficiently close, then other components of P indicate the x and y position of the object. This information could be coded in a variety of ways, for example, as absolute position, or relative position, that is, the change in the object's position since the last signal.

The value of W as determined at step 600 above may be used to determine if an object is in sufficiently close proximity to the pad that the x and y position determined in steps 610 and 620 is meaningful. This is done by comparing W to some threshold value Wth>0. If W>Wth then the object is sufficiently close SO that position information is meaningful. If W<Wth then the object is not close and the position information is not meaningful. The value Wth can be determined empirically by locating the object to be sensed at a proximity slightly more distant than that at which position sensing is desired to occur. The value of W determined with this arrangement is a suitable value for Wth.

In preferred embodiments, the control means makes one complete cycle through this algorithm every 5.5 milliseconds. Other periods may be achieved with no significant change in operation. The period may be further adapted for the particular utilization means used by the system. If the pad multiplicity is greater than one, the period should be sufficiently short to ensure that the sensed object never moves more than half the fundamental VDE width during one period.

Referring to FIG. 17, a flow chart for determining W is shown. At step 670, a column VDE is selected corresponding to index IB, and a row VDE is selected corresponding to JB. At step 680, the capacitive balance measurement means is directed to measure the balance L between the row and column VDEs which have been selected. At step 690, the proximity is determined and defined to be a constant equal to LNOM minus L. LNOM is set such that W equals zero when no object is present to be sensed. W increases as the object comes into closer proximity with the pad.

Figure 18:
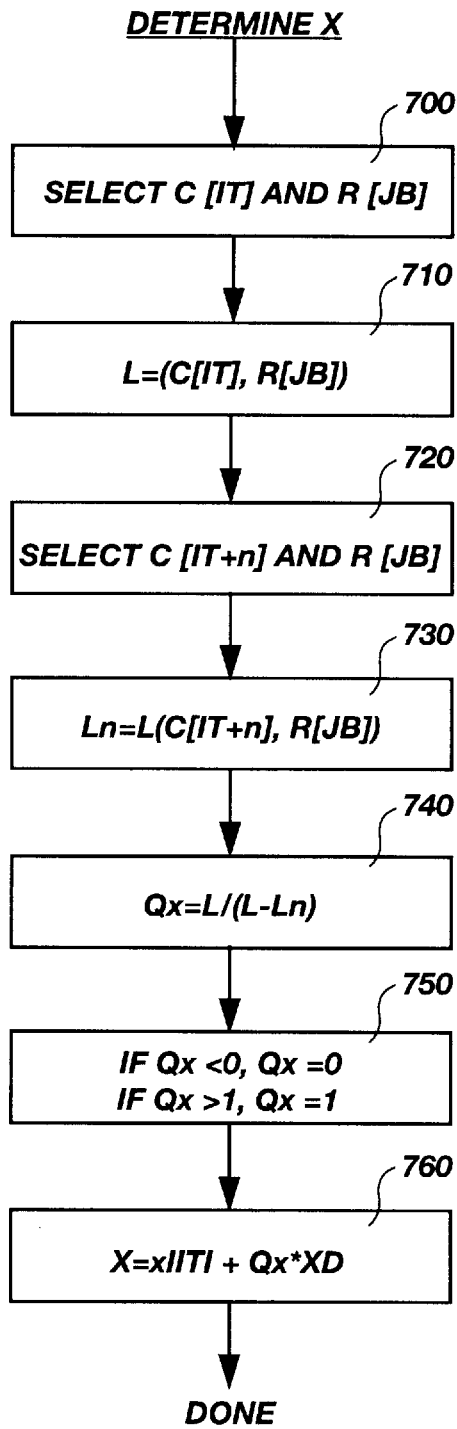
FIG. 18 is a flow chart to determine the x position of an object.

FIG. 18 details determination of the object's x position. At step 700, a column VDE corresponding to index IT is selected and a row VDE corresponding to JB is selected. At step 710, the capacitive balance measurement circuit is directed to measure the balance L, between C[IT] and R[JB]. Selection of a column VDE corresponding to index IT+n and a row VDE corresponding to JB is accomplished at 720. The number n is a target index offset. In preferred embodiments, n=1. In other preferred embodiments, n may have an integer value greater than one.

At step 730, the capacitive balance measurement circuit measures the balance Ln between C[IT+n] and R[JB]. At step 740, the balance ratio determination circuit calculates Qx=L/(L−Ln) where L and Ln are the two balances previously measured.

Qx is limited at step 750 to be in the range of zero through one, inclusive. If Qx is less than zero, it is set to zero. If Qx is greater than one, it is set to one.

At step 760, the X position=x[IT]+Qx*XD is calculated. XD is the distance between column VDE locations x[IT] and x[IT+n]. The calculation for X interpolates a position between these two column VDE locations.

Figure 19:
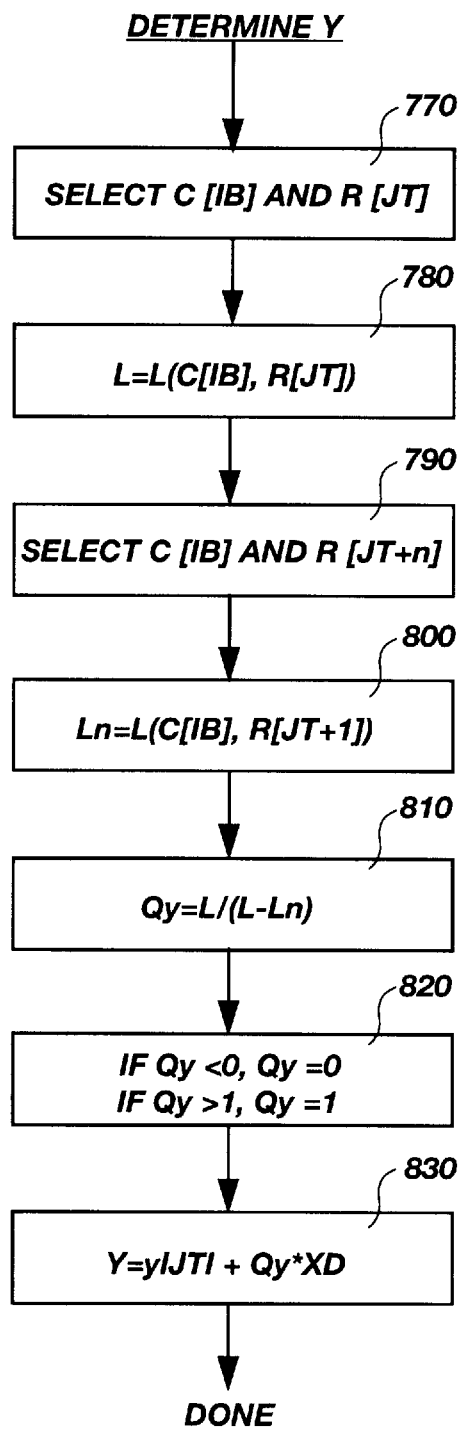
FIG. 19 is a flow chart to determine the y position of an object.

Referring to FIG. 19, determination of the object's Y position is shown. At step 770, a column VDE corresponding to index IB is selected, and a row VDE corresponding to JT is selected. At step 780, the capacitive balance L between C[IB] and R[JT] is measured. Selection of a column VDE corresponding to index IB and a row VDE corresponding to JT+n is accomplished at step 790.

At step 800, the capacitive balance measurement means measures the balance Ln, between C[IB] and R[JT+n]. The balance ratio determination means calculates Qy=L/(L−Ln) at step 810 where L and Ln are the two balances just measured. At step 820, Qy is limited to the range of zero through one, inclusive. If Qy is less than zero, it is set to zero. If Qy is greater than one, is set to one.

At step 830, the object's y position=y[JT]+Qy*YD is calculated. YD is the distance between row VDE location y[IT] and y[IT+n]. The calculation for y position interpolates a position between the two row VDE locations.

Figure 20:
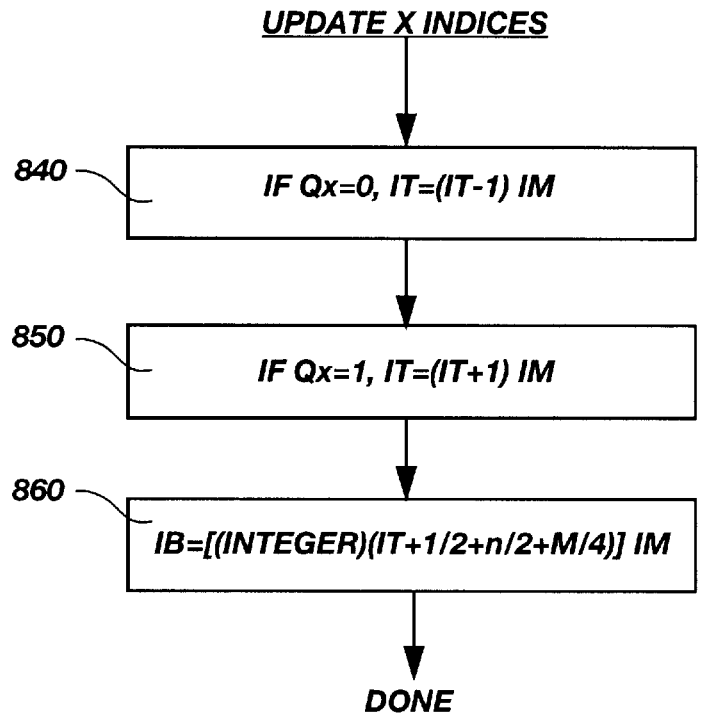
FIG. 20 is a flow chart to accomplish x position index updating.

Referring to FIG. 20, the X indices are updated. At step 840, the Qx ratio is tested. If Qx equals zero, the sensed x position is at, or possibly to the left of, C[IT]. In this case, one is subtracted from the current IT. The result is taken modulo M, where M is the number of column VDEs. This updates IT corresponding to the next column to the left.

At step 850, Qx is again tested. If Qx equals one, the sensed x position is at, or possibly to the right of, C[IT+n]. In this case, one is added to IT, modulo M. This updates IT to the right.

At step 860, the value IT+½+n/2+M/4 is rounded to the nearest integer. The rounded value is taken modulo M and assigned to IB. This ensures that the positive half of C[IB] is nearly centered over the region between the updated x[IT] and x[IT+n].

Figure 21:
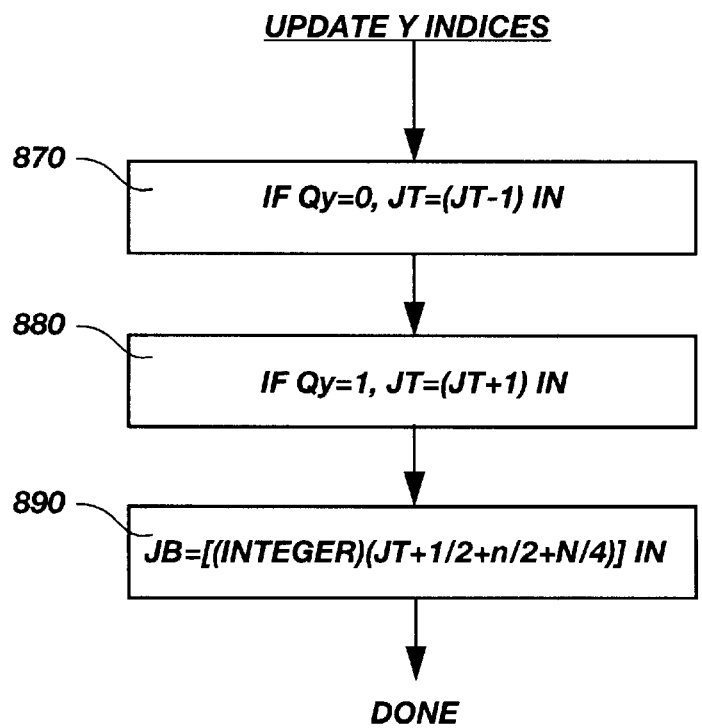
FIG. 21 is a flow chart to accomplish y position index updating.

Referring to FIG. 21, the Y indices are updated. At step 870, the Qy ratio is tested. If Qy equals zero, the sensed Y position is at, or possibly below, R[JT]. In this case, one is subtracted from the current JT. The result is taken modulo N, where N is the number of row VDEs. This updates JT corresponding to the next row below.

Qy is again tested at step 880. If Qy equals one, the sensed Y position is at, or possibly above, R[JT+n]. In this case, one is added to JT, modulo N. This updates JT to the next row above. At step 890, the value JT+½+n/2+N/4 is rounded to the nearest integer. The rounded value is taken modulo N and assigned to IB. This ensures that the positive half of R[IB] is nearly centered over the region between the updated y[JT] and y[JT+n]. In preferred embodiments, a fractional number A+½ is rounded down to the integer A. In further preferred embodiments, A+½ is rounded up to A+1.

The circuitry to accomplish the above-referenced flow charts can be implemented in a variety of ways. All or part of the circuitry might be contained in one or more Application Specific Integrated Circuits (ASICs). In preferred embodiments, the circuitry may be implemented using standard integrated circuits, microprocessors, microcomputers, or other electronic components.

There have thus been described certain preferred embodiments of methods and apparatus provided in accordance with this invention to sense an object's position. While preferred embodiments have been disclosed, it will be recognized by those with skill in the art that modifications are within the spirit and scope of the invention. The appended claims are intended to cover all such modifications.

What is claimed is:

1. Apparatus for determining position of a conductive passive object such as a person's finger, hand, or conductive object held in the person's hand comprising
    at least one first electrode strip,
    at least one second electrode strip disposed adjacent to the first electrode strip to cross thereover and define a cross-over region,
    means for supplying electrical charges to the at least one first electrode strip and the at least one second electrode strip, to thereby develop electric fields such that a mutual capacitance is present therebetween, said mutual capacitance decreasing when the object is positioned in proximity to the cross-over region, the degree of such decrease depending upon the relative position of the passive object to the cross-over region,
    means for measuring the decrease in mutual capacitances between the strips, and
    means responsive to said measuring means for determining the position of the object relative to the cross-over region.

2. Apparatus as in claim 1 wherein the electrode strips are elongate and substantially longer than the length or width of the cross-over region.

3. Apparatus as in claim 2 further comprising
    a plurality of spaced-apart second electrode strips disposed adjacent to the first electrode strip to cross thereover and define a plurality of cross-over regions, such that mutual capacitances are present between the first electrode strip and each of the second electrode strips,
    means for measuring the decrease in mutual capacitances between the first electrode strip and each of the second electrode strips, and
    means responsive to said measuring means for determining the position of the object relative to the cross-over regions.

4. Apparatus as in claim 3 wherein the second electrode strips are arranged generally parallel with one another, and generally at right angles with the first electrode strip.

5. Apparatus as in claim 3 further comprising
    a plurality of spaced-apart first electrode strips disposed adjacent to the second electrode strips to cross thereunder and define a cross-over region at each location where one of the second electrode strips crosses over one of the first electrode strips, such that mutual capacitances are present between each of the first electrode strips and each of the second electrode strips,
    means for measuring the decrease in mutual capacitances between the first electrode strips and the second electrode strips, and
    means responsive to said measuring means for determining the position of the object relative to the cross-over regions.

6. Apparatus as in claim 5 wherein the first electrode strips are arranged generally parallel with one another, wherein the second electrode strips are arranged generally parallel with one another, and wherein the second electrode strips cross over the first electrode strips generally at right angles.

7. Apparatus as in claim 5 further including insulator means disposed between the first electrode strips and the second electrode strips.

8. Apparatus as in claim 5 further including
    control means operatively coupled to the synthesis means for supplying control signals to the synthesis means to thereby specify which of the first electrode strips and second electrode strips are to constitute the positive halves and negative halves.

9. Apparatus as in claim 8 wherein said position determining means comprises
    balance ratio measuring means for determining electrical balance ratios from the mutual capacitances among the virtual dipole electrode halves, and
    means for determining the position of the passive object from the balance ratios.

10. Apparatus for determining the position of a conductive passive object such as a person's finger or hand or conductive object held in the person's hand comprising
    pad means for sensing the object's position, the pad means including
        a plurality of first electrode strips spaced apart in a first array
        one or more second electrode strips disposed to cross over the first electrode strips to define overlapping regions on the first electrode strips by the second electrode strip, wherein mutual capacitances are developed between the first electrode strips and second electrode strip, wherein the object perturbs the mutual capacitances when the object comes in proximity to the pad means, thereby decreasing the mutual capacitances, and measurement means operatively coupled to the pad means for measuring the decrease in mutual capacitances in the pad means to thereby determine the position of the object relative to the pad means.

11. Apparatus as in claim 10 wherein said measurement means includes synthesis means responsive to control signals for selecting first electrode strips and the second electrode strip, between which electric fields are to be developed in the course of measuring mutual capacitance decreases, control means for supplying control signals to the synthesis means to designate the selected first electrode strips, and means for measuring the charge supplied to the strips to thereby measure the mutual capacitances in the pad means and this determine the location of the object.

12. Apparatus as in claim 11 wherein the pad means further comprises insulator means having first and second sides electrically interfaced with the plurality of first electrode strips on the first side for providing an insulating substrate for the pad means, and said second electrode strip being interfaced with the insulator means on the second side.

13. Apparatus as in claim 12 wherein said pad means further comprises a plurality of second electrode strips spaced apart in a second array to extend at an angle to the direction in which the first electrode strips extend so that each electrode strip in the second array crosses over each electrode strip in the first array to define a plurality of overlapping regions of the first electrode strips by the second electrode strips, wherein the synthesis means includes means responsive to control signals for selecting second electrode strips and first electrode strips between which electric fields are to be developed in the course of measuring mutual capacitance decreases, wherein the control means includes means for supplying control signals to the synthesis means to designate the selected second electrode strips, and first electrode strips, and wherein the charge supplying means includes means for supplying electrical charges to selected electrode strips in the first array and second array to thereby establish electric fields between the selected electrode strips of the first array and the selected electrode strips of the second array at the overlapping regions.

14. Apparatus as in claim 13 wherein said charge supplying means further includes means for supplying electrical charges to selected pairs of electrode strips in the first array to thereby form selected virtual dipole electrodes in the first array, and to selected pairs of electrode strips in the second array to thereby form selected virtual dipole electrodes in the second array, each virtual dipole electrode having a positive half electrode strip and a negative half electrode strip such that electric fields are established between selected halves of each polarity in the first array, and selected halves of each polarity in the second array.

* * * * *